(12) United States Patent
Wunderlich et al.

(10) Patent No.: US 7,540,455 B2
(45) Date of Patent: Jun. 2, 2009

(54) HOLDER FOR LINES AND CABLES

(75) Inventors: Dennis Wunderlich, Buxtehude (DE); Christian Pampel, Bargteheide (DE); Christian Schoof, Horneburg (DE)

(73) Assignee: Airbus Deutschland GmbH, Hamburg (DE)

( * ) Notice: Subject to any disclaimer, the term of this patent is extended or adjusted under 35 U.S.C. 154(b) by 236 days.

(21) Appl. No.: 11/246,858

(22) Filed: Oct. 7, 2005

(65) Prior Publication Data

US 2006/0169850 A1 Aug. 3, 2006

Related U.S. Application Data

(60) Provisional application No. 60/618,146, filed on Oct. 13, 2004.

(30) Foreign Application Priority Data

Oct. 13, 2004 (DE) .................. 10 2004 049 894

(51) Int. Cl.
*F16L 3/22* (2006.01)
(52) U.S. Cl. .................. 248/68.1; 174/135; 248/916
(58) Field of Classification Search .................. 248/49, 248/68.1, 62, 65, 73, 916
See application file for complete search history.

(56) References Cited

U.S. PATENT DOCUMENTS

| 3,087,984 | A | * | 4/1963 | Waranch .................. 174/135 |
| 3,494,584 | A | * | 2/1970 | Dubey .................. 248/219.4 |
| 5,169,100 | A | | 12/1992 | Milcent et al. |
| 5,388,790 | A | | 2/1995 | Guthke et al. |
| 5,876,000 | A | | 3/1999 | Ismert |
| 6,375,017 | B1 | * | 4/2002 | Schattner et al. .......... 211/85.13 |
| 6,536,717 | B2 | * | 3/2003 | Parker .................. 248/49 |
| 2001/0048053 | A1 | * | 12/2001 | Donoho .................. 248/68.1 |

FOREIGN PATENT DOCUMENTS

| DE | 1925250 | 5/1969 |
| DE | 93 06 143.9 | 4/1993 |
| EP | 0 054 478 | 6/1982 |
| EP | 0 498 058 A1 | 12/1991 |
| FR | 2437719 | 4/1980 |

* cited by examiner

*Primary Examiner*—Ramon O Ramirez
(74) *Attorney, Agent, or Firm*—Christopher Paradies; Fowler White Boggs P.A.

(57) ABSTRACT

A holder for holding electrical lines in aircraft construction comprises a base and a component extending away for the base for holding the electrical lines, the holder being made of plastic. The plastic may be a glass-fiber reinforced polyamide material. The component may be formed of the same material as the base in a single injection molding process and may have ribs formed that provide substantial stiffening to the component.

12 Claims, 3 Drawing Sheets

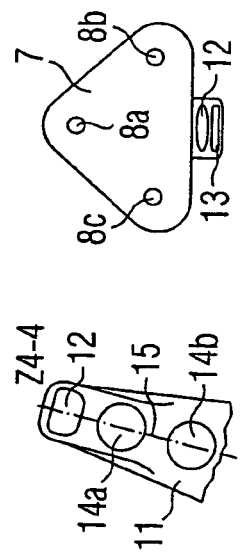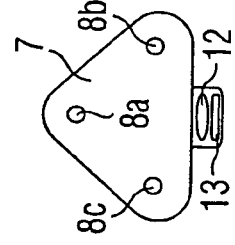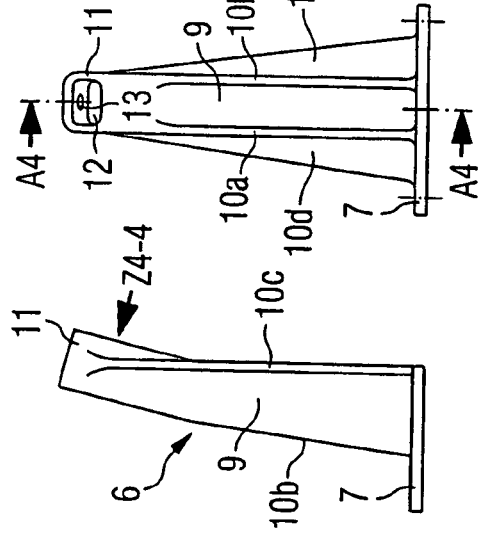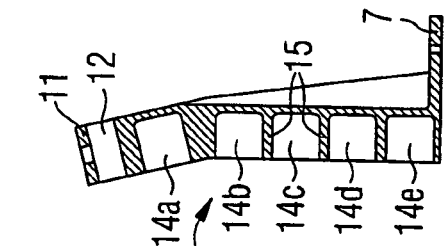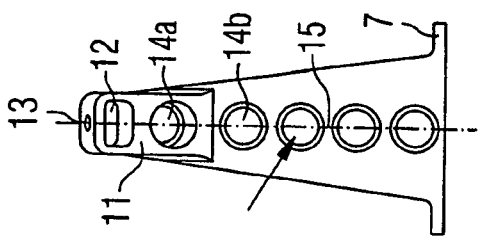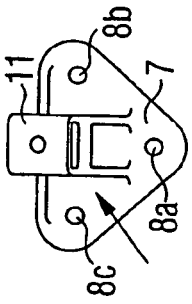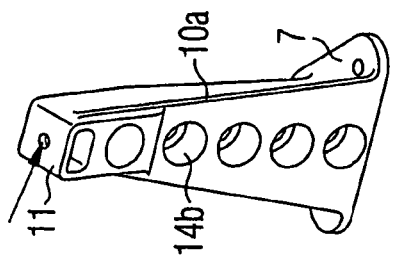

HOLDER FOR LINES AND CABLES

RELATED APPLICATIONS

This application claims the benefit of the filing date of U.S. Provisional Patent Application No. 60/618,146 filed Oct. 13, 2004 and of German Patent Application No. 10 2004 049 894.6 filed Oct. 13, 2004, the disclosure of which is hereby incorporated herein by reference.

FIELD OF THE INVENTION

The field relates to holders, particularly to holders for electrical lines in aircraft construction.

BACKGROUND

Holders have been installed and used in aircraft construction for many years. Holders may be installed and used in aircraft construction, and such holders may be riveted to the structure (carbon-fiber reinforced plastic (CFRP), "kohlenfaserverstärkter Kunststoff" (CFK)) or aluminum). These holders primarily have the function of holding electrical lines.

Holders in aircraft construction may be made of aluminum FIG. 1 shows a holder 1 which may be used in aircraft construction in order to hold electrical lines. The holder 1 is made of aluminum and comprises a first angled area 2. The holder 1 made of aluminum is typically riveted to the structure of an aircraft fuselage via connection points 3a, 3b.

The holder 1 shown in FIG. 1 also comprises a second angled area 4, which contains a drilled hole or bore 5, via which electrical lines (not shown) are typically attached to the holder 1 using a cable clip.

According to the newest Technical Design Directives TDD 92A001L Issue C for the program A380, the holder 1 made of aluminum, such as shown in FIG. 1, must additionally be provided with a connection to ground.

However, performance criteria and fuel savings desired for modern aircraft place a premium on weight savings, and ease of installation and reduced costs are always important factors in assembly of modern aircraft that have an increasing volume and complexity of wiring, optical fibers or other lines and cables.

SUMMARY OF THE INVENTION

A holder has a base made of a polymeric material, such as a plastic. The holder also has a component that extends away from the base. The base may be connected to the structure of the aircraft fuselage.

In one example, the plastic is glass-fiber reinforced, which has a low weight and nonetheless fulfills the requirements of strength, stiffness and durability to be capable for operational use in an aircraft. In one example, the base or the entire holder is made of a polyamide, such as (PA) 66 WL 5.2206.3, having a low density of $1.40 \text{ g/cm}^3$ and a higher rigidity than aluminum and PEEK. Because of the low density and high rigidity, a holder made of this material has a lower weight than a holder made of aluminum or PEEK.

Polyamide (PA) 66 denotex polyamides which are manufactured from the educts hexamethylene diamine and adipic acid. Polyamides typically have a density of $1.01$-$1.14 \text{ g/cm}^3$. Strength, modulus of elasticity, and dimensional stability are elevated through glass-fiber reinforcement. According to an exemplary embodiment of the invention, the above-mentioned polyamide is reinforced with approximately 35 weight-percent glass fibers, through which the row density of $1.40 \text{ g/cm}^3$ results.

The cited polyamide has a low internal tension, high thermal stability from $-50°$ C. to $+130°$ C. and does not cause any change in (micro)structure upon impact because of high strength, impact toughness, and hardness. The high shaping and the outstanding resistance to fats, benzene, mineral and lubricant oils, and Skydrol 500B may be additionally an advantage in aircraft construction. Furthermore, a holder according to an exemplary embodiment of the invention which is made of the above-mentioned polyamide has good electrical insulating capability.

The holder made of polyamide according to an exemplary embodiment of the invention does not require a connection to ground or a surface protection. Furthermore, at high piece counts, a changeover may be made to injection molded parts, which has a positive effect on the manufacturing costs of the holder. In this case, all advantages of a holder made of polyamide, such as the filigree shaping and the possibility of being combined with metal parts if necessary, may be exploited.

BRIEF DESCRIPTION OF THE DRAWINGS

In the following, an exemplary embodiment of the invention will be described with reference to the drawings.

FIGS. 3A-H show different views of an embodiment.

DETAILED DESCRIPTION OF PREFERRED EMBODIMENTS OF THE INVENTION

Figure 1:
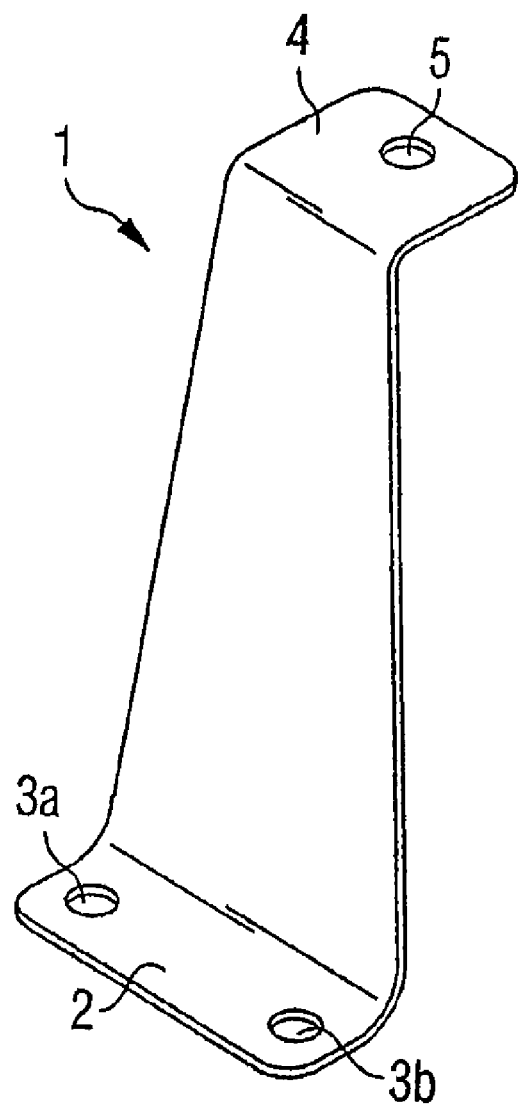
FIG. 1 shows a perspective view of an aluminum holder.
Figure 2:
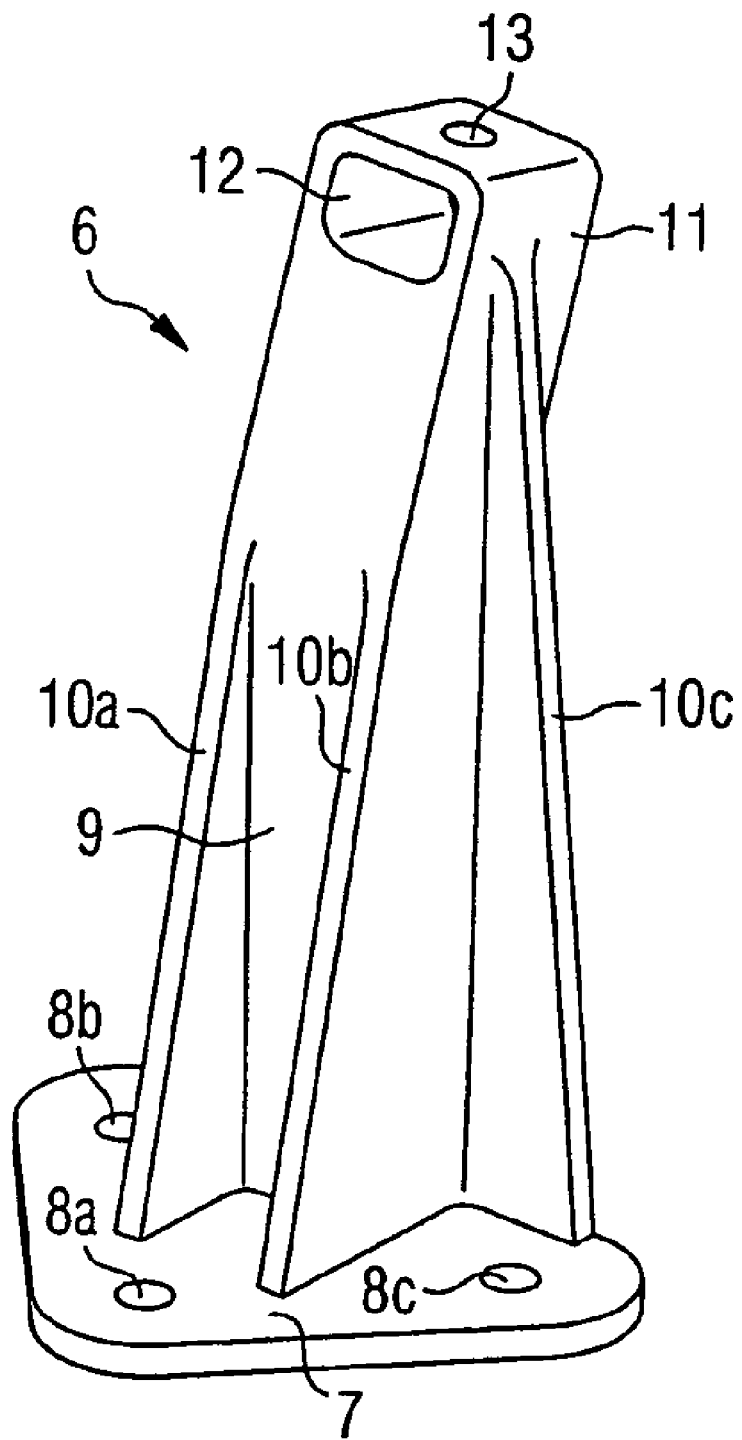
FIG. 2 shows a perspective view of an embodiment.

FIG. 2 shows a perspective view of a holder 6. The holder 6 has a base 7, in which holes 8a, 8b, 8c are present. The base 7 may be triangular, for example, with holes 8a-c present at the corner regions. Other constructions of the base 7 are possible depending on the area of use and space available. The holes may be formed by any process either during forming of the base 7 or thereafter. The base may be made of a polymeric material, such as a plastic. Polyamide (PA) 66 WL 5.2206.3 having 35 weight-percent glass fibers and a bulk density of $1.40 \text{ g/cm}^3$ is capable of providing a base that saves weight compared to aluminum while meeting all of other requirements for use of a holder in aircraft.

The base 7 is capable of being attached via the holes 8a-c to the structure of an aircraft fuselage. Depending on the material of the structure (for example, carbon-fiber reinforced plastic (CFRP), "kowlenfaserverstärkter Kunststoff" (CFK), or aluminum), different bonding techniques may be used. Examples of permanent bonds of parts made of polyamide are heated tool welding, spin welding, vibration welding, ultrasonic welding, riveting using ultrasound, riveting, and gluing. Examples of detachable connections are snapping, press fitting, and screwing. Any one or a combination of these methods may be used for mounting the holder 6.

Although three holes 8a-c are shown in FIG. 2 for attaching the base 7 to a structure of an aircraft fuselage, any number of attachment points may be provided on the base 7, if necessary. Alternatively, fasteners may not be needed, such as when the base 7 is adhered to the structure of the aircraft. Then, holes may be omitted.

As shown in FIG. 2, a component 9 extends away from the base 7. Although the component is shown to extend substantially perpendicularly from the base 7, any angle may be chosen. The component 9 may be of any material. In one example, the component 9 is made of the same polyamide as the base 7, which allows the component to be made at the same time as the base 7, for example. Alternatively, the component 9 may be made of aluminum or another light metal, a composite or a polymeric material, and the component 9 may be attached to the base 7 using any of the known bonding and fastening techniques.

As shown in FIG. 2, the component 9 and the base 7 are implemented in one piece, which may use any process for forming of the holder 6, such as injection molding, for example. Alternatively, the base 7 and the component 9 may be formed separately and may be bonded using any of the known bonding techniques.

The component 9 may have reinforcing ribs 10a-c, which are capable of providing increased stiffness to weight. The reinforcing ribs 10 shown in the drawings extend substantially perpendicularly from the base 7 in the longitudinal direction of the component 9 and are used to improve the static rigidity of the holder 6. The reinforcing rib 10c is positioned substantially perpendicularly to the reinforcing ribs 10a and 10b. Substantially perpendicularly is used herein to describe a member that extends normal to another surface within functional limitations, meaning that any variation from perpendicularity, if not substantially reducing performance of the holder 6 compared to a perpendicular member, is substantially perpendicular. For example, the reinforcing ribs 10a-10c are implemented as broader in the area of the base 7 than at an exposed end of the reinforcing ribs 10a-c. The reinforcing ribs 10a-c thus have essentially the shape of a triangle. Nevertheless, such ribs 10a-c are considered substantially perpendicular, because the tapering profile of the ribs 10a-c does not substantially reduce the performance of the ribs compared to ribs having a non-tapered profile.

The component 9 comprises an end portion 11 on an exposed end distal from the base 7. This end portion 11 of the component 9 is slightly angled in relation to the longitudinal direction of the component 9 extending away from the base 7. An angled end portion 11 may make insertion of wires easier.

The end portion 11 contains a recess 12 (also referred to in the following as a through hole) for a clip nut.

For example, a front face of the end portion 11 may have a drilled hole 13, which produces a connection to the through hole 12. For example, electrical cables, which are held by the holder 6, may be attached to the holder 6 using a cable clip via this drilled hole 13.

FIGS. 3A-H show different views of the example illustrated in FIG. 2. For ease of comparison, identical and similar elements are provided with identical reference numerals.

FIG. 3A shows the end portion 11 of the component 9. The end portion 11 is implemented in such a way that it tapers toward the through hole 12. As shown in FIG. 3A, openings 14a, 14b are produced in the end portion 12 of the component 9, which may be used for saving weight, for example. The openings 14a and 14b form webs 15, which contribute to improving the static rigidity of the end portion 11.

FIG. 3B shows a top view of the base 7 from above. As shown in FIG. 3B, the end portion 11 of the component 9 is adjacent to the base 7 in a top view from above.

FIG. 3C shows a side view of the holder 6, it being clearly shown that the end portion 11 of the component 9 is implemented as angled away from the longitudinal direction of the component 9. The reinforcing rib 10c extends essentially perpendicular from the base 7 in the direction of the end portion 11. The end portion 11 of the component 9 is angled outward away from the base 7 at the end of the reinforcing ribs 10 facing away from the base 7.

FIG. 3D shows the holder 6 from behind.

FIG. 3E shows a cross-sectional side view along the section line A4-A4 in FIG. 3D.

As is clearly shown, openings 14b, 14c, 14d, 14e are produced at regular intervals on a side 16 which forms a contact area for holding electrical lines, for example. These openings only partially penetrate the component 9 and are used for improving the static rigidity and for saving weight in the holder 6 by forming webs 15 between the openings 14.

As shown in FIG. 3E, the through hole 12 for a clip nut runs through the end portions 11 of the component 9.

FIG. 3F shows a view of the holder 6 from the front.

FIG. 3G shows the base 7 from below and FIG. 3H shows the holder 6 in a diagonal view from the front.

Although an example has been used to describe the present invention, this particular example should not be used to limit the claims that issue. A routine practitioner may be able to make many different modifications and changes based on the drawings and description provided. A specific polyamide is described that meets all of the requirements for aircraft holders. Surprisingly, it has a toughness, stiffness and strength that provides weight savings compared to other known systems for holders used in commercial aircraft. Other materials may be used with the same or similar designs, if the properties are comparable to the materials described. Other advanced composites may achieve the same results but at an unrealistically, non-commercial acceptable cost. Thus, it would not be obvious to replace a low-cost and readily manufactured material, such as the material used in the examples, with a high-cost or difficult to manufacture material. Also, many polymeric materials do not have the strength, toughness, heat resistance, resistance to cyclic and vibrational fatigue and stiffness, even if ribs are added, to be a practical alternative material for use in aircraft holders.

Furthermore, the holder according to the examples may be used in other applications having similar requirements, such as cars, trucks, buses, trains, spacecraft, containers, military vehicles, other modes of transport, floating docks, bridges and other structures.

It should be noted that the term "comprising" does not exclude other elements or steps and the "a" or "an", does not exclude a plurality. Also elements described in association with different embodiments may be combined.

It should also be noted that reference signs in the claims shall not be construed as limiting the scope of the claims.

| List of reference numerals | |
|---|---|
| 1 | holder |
| 2 | angled first area |
| 3a, 3b | attachment points |
| 4 | angled second area |
| 5 | bore |
| 6 | holder according to the invention |
| 7 | base |
| 8a-c | holes |
| 9 | component |
| 10a-c | reinforcing ribs |
| 11 | end portion |
| 12 | through hole |
| 13 | bore |
| 14 | openings |
| 15 | webs |
| 16 | support surface |

What is claimed:

1. A holder for electrical lines in aircraft comprising:
a base made of a plastic for attachment to a structural member of an aircraft; and a component having a support surface, the support surface having a thickness and a length extending from the base and a plurality of recesses including at least three recesses spaced at regular intervals along the length of the support surface, the plurality of recesses extending downwardly into the thickness of the support surface and not penetrating through the thickness of the support surface of the component.

2. The holder of claim 1, wherein the component is permanently or removably bonded to the base.

3. The holder of claim 1, wherein the component comprises a reinforcing rib.

4. The holder of claim 3, wherein the reinforcing rib extends along the length of the support surface of the component.

5. The holder of claim 1, wherein at least one of the plurality of recesses extends into the support surface in a direction substantially aligned with a plane of attachment of the base.

6. The holder of claim 1, wherein the component has an end portion slanted at an angle relative to a portion of the length extending from the base.

7. The holder of claim 1, wherein the component has at least one bore hole penetrating through the thickness of the component.

8. The holder of claim 1, wherein the component is made of a plastic.

9. The holder of claim 8, wherein the plastic is a polyamide.

10. The holder of claim 9, wherein the polyamide has a bulk density of 1.40 g/cm$^3$ or less.

11. The holder of claim 9, wherein the polyamide comprises 35 weight-percent glass fibers.

12. The holder of claim 1, wherein the component is free of reinforcing ribs.

* * * * *